June 25, 1940. H. B. FOSTER ET AL 2,205,402
MANUFACTURE OF MALEIC ANHYDRIDE
Filed Jan. 13, 1937
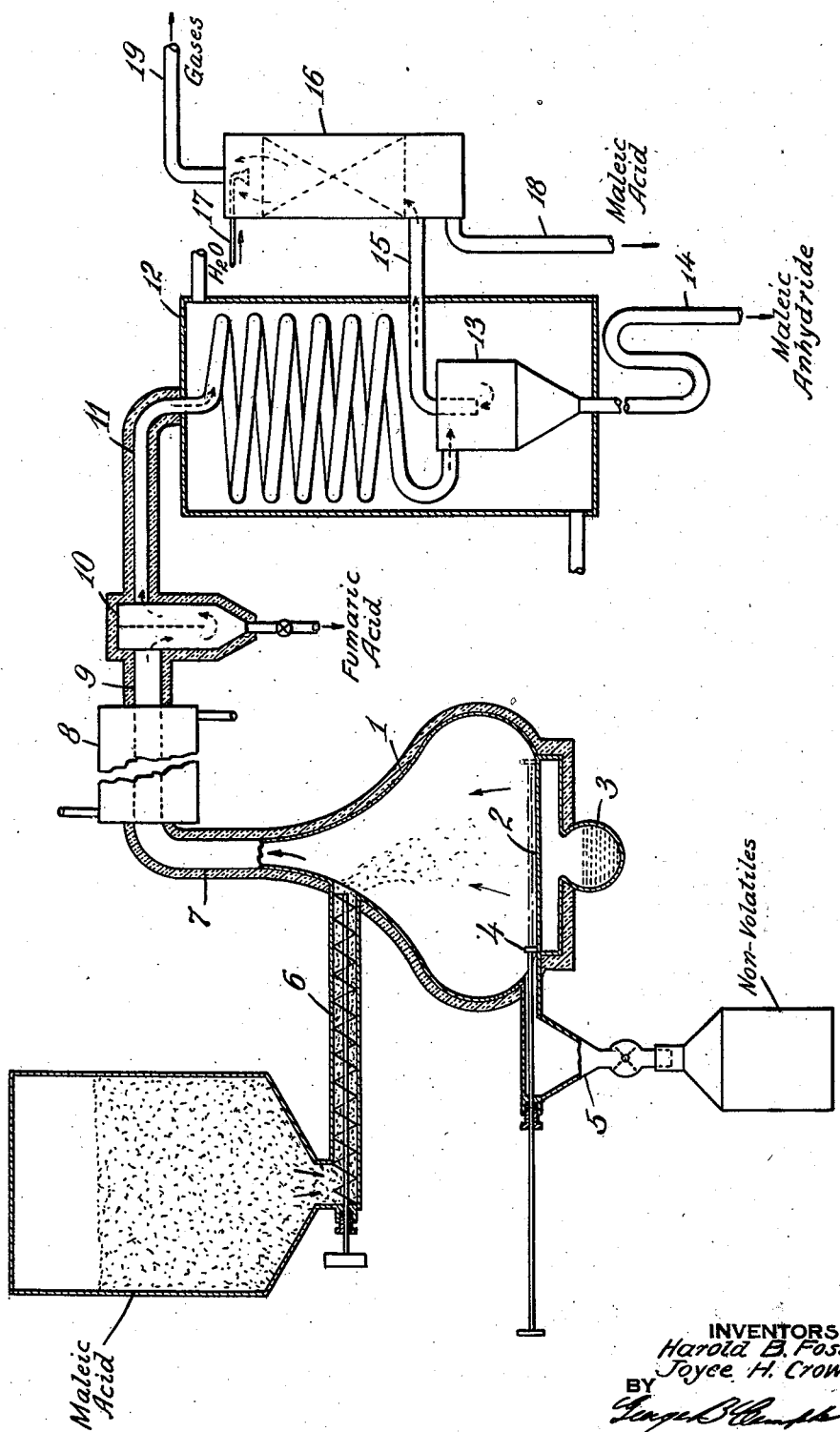
INVENTORS
Harold B. Foster
Joyce H. Crowell
BY
ATTORNEY Patented June 25, 1940

2,205,402

UNITED STATES PATENT OFFICE 2,205,402

MANUFACTURE OF MALEIC ANHYDRIDE

Harold B. Foster and Joyce H. Crowell, Buffalo, N. Y., assignors to National Aniline & Chemical Company, Inc., New York, N. Y., a corporation of New York Application January 13, 1937, Serial No. 120,381

11 Claims. (Cl. 260—343)

This invention relates to the manufacture of maleic acid anhydride. More particularly it is directed to a method for the vaporization of maleic acid and the formation of vapor mixtures containing maleic acid anhydride from which the anhydride may be recovered relatively free from acid.

It has been recognized that the formation of fumaric acid is accelerated by heat and accordingly prior art methods of decomposing maleic acid has stressed the importance of avoiding as far as possible the heating of the maleic acid to elevated temperatures. It has been proposed in the past to convert maleic acid to its anhydride by heating the maleic acid under vacuum at temperatures of 110° to 135° C. to decompose the acid and drive off evolved water. The application of this process to maleic acid, however, not only effects elimination of water from the maleic acid but also causes transformation of very substantial quantities of the maleic acid into fumaric acid.

It has now been discovered that although the rate of fumaric acid formation is accelerated by elevated temperatures the rate of decomposition of maleic acid to form maleic acid anhydride is accelerated to a much greater extent within certain limits. This discovery has led to the development of a process whereby maleic acid may be decomposed to the anhydride with the formation of wholly insignificant proportions of fumaric acid.

Whereas prior art processes of producing the anhydride from maleic acid have resulted in conversion of from about 20% to about 30% of the material subjected to the thermolytic treatment to fumaric acid, the present method has been found to yield fumaric acid amounting to as little as 1%, or even less, of the maleic acid.

It is an object of the present invention to effect the conversion of maleic acid to maleic acid anhydride (hereinafter referred to simply as maleic anhydride) with a minimum formation of fumaric acid. It is also an object of the invention to effect the thermolysis of maleic acid in a simpler and more efficient manner than by former processes and to improve the yield of maleic anhydride produced, both as to quantity and purity. Further objects will appear from the following description of the invention.

In accordance with the process of the present invention maleic acid is subjected to "total" vaporization by contact with a heating medium maintained at a temperature well above the decomposition point of the acid so that the maleic acid is practically instantly decomposed and a vapor mixture comprising maleic anhydride and water vapor is formed.

In order to obtain satisfactory results, the maleic acid should be heated rapidly to a temperature above 150° C. or at least the vapors produced should attain such a temperature. Conditions agreeable to rapid vaporization assist the process since with the material in the vapor state there seems to be little, if any, tendency to form fumaric acid. Presumably this is because the maleic acid is in the form of the anhydride and as long as it is in this form transformation to fumaric does not take place. Accordingly the vapors should be allowed free egress from the thermolytic chamber and preferably the process is applied in vacuo, since the facile control of the reduced pressure in the apparatus provides an instrumentality for controlling the "flashing" of the maleic acid and the removal of vapor from the apparatus. Alternatively an inert carrier gas may be used to assist the decomposition. However, the use of such a gas requires increased heat input and careful attention to maleic anhydride recovery to avoid losses in the gas, unless the latter is recirculated and this involves somewhat more complicated apparatus.

To effect the rapid transfer of heat to maleic acid when the latter makes contact with the hot vaporizing surface, the said surface is maintained at a temperature which is above 150° C. but below the temperature at which maleic acid or maleic anhydride are thermically destroyed. In commercial practice it has been found that for effective operation it is preferable to maintain the vaporizing surface at a temperature between about 160° C. and about 400° C., especially between 180° C. and 350° C.

For any suitable combination of temperature of the vaporizing surface and vapor pressure in the vaporizing chamber, the rate of introduction of maleic acid into the said chamber is so controlled and adjusted that the resulting vapors are above 150° C., and if the temperature of the vapors in the heating chamber falls below 150° C., this fact is an indication that the feed of maleic acid is too fast for the conditions extant in the chamber. Preferably the vapors produced are maintained between about 160° C. and about 250° C. by suitable adjustment of the rate of addition of the maleic acid while the temperature of the vaporizing surface and the selected subatmospheric pressure in the thermolytic chamber are maintained as uniform as possible.

The process of the present invention may be applied to maleic acid which is in solid or liquid form or to maleic acid solutions.

The minimum satisfactory temperatures at which the process of the present invention may be carried out are reduced by application of vacuum, the temperatures near the bottom of the range specified being most satisfactory for reduced pressures. However, the process, even though carried out at low pressure, may also be carried out at relatively high temperatures. Thus, the thermolytic step in its preferred form is carried out at an absolute pressure between about 100 mm. and about 250 mm. of mercury, and is adjusted so that the temperature of the gases in the vaporizing chamber is between about 160° C. and about 250° C. Higher temperatures can be used; but it has been found that as the temperature of operation approaches 400° C., there is an increasing thermal destruction of maleic acid and maleic anhydride. At atmospheric pressure, the preferred range of temperatures of the vapors is from about 200° C. to about 300° C. If an inert carrier medium is employed, the temperatures used may correspond to those employed for vacuum operation; however, as previously noted, the use of sufficient inert gas to supplant the use of vacuum is subject to certain operating disadvantages and hence use of vacuum is preferred.

Any suitable apparatus may be employed for effecting the decomposition process of the present invention. In general a clean metallic surface of high heat conductivity provides relatively high output and uniformity of operation. Heating of the vaporizing surface may be effected by steam or other saturated or superheated vapor, by a hot liquid, or by hot combustion gases, or in any other convenient manner, the essential condition being maintenance of the surface which contacts with the maleic acid at the desired temperature between about 160° C. and about 400° C., while the maleic acid is being contacted therewith.

The method of bringing the maleic acid into contact with the hot surface should necessarily be adapted to the physical state of the maleic acid. If molten maleic acid or maleic acid solutions are employed, they may be contacted with the hot surface in the form of a stream or spray by means of any suitable distributing devices, such as spray nozzles or centrifugal disc spray devices. Slurries or pastes of maleic acid may be conveyed into the heating chamber by means of extruding devices or by screw conveyors, etc. Solid maleic acid may be brought into contact with the vaporizing surface by means of spray discs or may be introduced into the heating chamber in the same manner as the pastes or slurries of maleic acid. The solid maleic acid may be in the form of crystals, granules or particles, the size of which is not of great importance, but in usual operation, they are preferably small enough to pass through screens from 4 mesh to 50 mesh.

Maleic acid normally contains small amounts of impurities. Upon vaporization of the maleic acid these impurities tend to remain on the vaporizing surface in the form of a dry deposit. If the temperature of the vaporizing surface is permitted to drop below the minimum specified temperature for a substantial period of time, it has been found that these impurities together with some of the maleic acid entering the vaporizing apparatus tend to form a plastic mixture which becomes hard and produces an insulating layer or deposit on the surface. In such circumstances, the heat transfer from the vaporizing surface to the maleic acid may be very much impaired, and hence the maleic acid may not be heated quickly enough to prevent the excessive formation of fumaric acid; therefore, if desired, means may be provided in the thermolytic chamber to scrape and remove the aforementioned deposits from the evaporating surfaces.

The vapors produced by the vaporization process consist primarily of maleic anhydride vapor and water vapor, the ratio of these constituents being dependent upon the percentage of water introduced into the system as well as upon the water formed by the maleic acid decomposition. The maleic anhydride may be separated from the water vapor in any suitable manner, such as by absorption of the maleic anhydride in an inert organic solvent or by a fractional condensation. The process of fractional condensation has been found particularly advantageous for effecting this recovery. To produce a maximum yield of maleic anhydride containing a minimum of maleic acid, it is desirable to keep the ratio of water to maleic anhydride in the vapors low and, for this reason, it is preferred to employ solid or molten maleic acid rather than maleic acid solutions as the initial material. The use of solutions is preferably limited to those containing more than about 25% of maleic acid, to avoid reworking excessive amounts of maleic acid solutions. Highly concentrated solutions or slurries containing more than 75% maleic acid, on the other hand, are not very fluid at ordinary temperature and require special feeding devices, or heating to effect solution and reduce viscosity, before they can be introduced into the thermolytic chamber. Heating is objectionable because it causes the formation of fumaric acid. Hence, the solid phase or solutions of a concentration between 25% and 75% are more satisfactorily worked.

The temperature most suitable for the condensation of maleic anhydride will depend upon the pressure at which the condensation is carried out, upon the content of inert gas, if any be present, and upon the amount of water vapor present. The condensation pressure may be substantially the same as that of vaporization or lower. Preferably the pressure of condensation is about the same as that of vaporization, being only so much lower as is necessary for propulsion of the vapors through the apparatus. In the preferred procedure, wherein no substantial quantity of inert gas is present, a condensation pressure between about 100 mm. and about 250 mm. of mercury (absolute) has been found highly satisfactory. Under these conditions, the condensation of maleic anhydride may be effected satisfactorily at a temperature between about 10° C. above the boiling point of water and about 25° C. below the boiling point of maleic anhydride at the prevailing pressure, for example between about 60° C. and about 140° C. More specifically, at an absolute pressure of about 100 mm. of mercury, a temperature between about 62° C. and about 106° C. may be employed to advantage whereas at about 250 mm. pressure condensation at a temperature between about 82° C. and about 136° C. may be advantageously employed. Maleic anhydride which is not condensed and remains in the uncondensed water vapor may be recovered in each case as maleic acid in the aqueous condensate obtained by further cooling of the said vapor. The maleic anhydride recovered as the first condensate fraction may be purified by redistillation, preferably in vacuo, to remove the maleic acid contained therein.

The quality and yield of maleic anhydride condensate vary with temperature and pressure of condensation, composition of the vapors, and the duration of contact of the anhydride condensate with water vapor; thus, a vapor mixture resulting from the total vaporization of maleic acid crystals may be condensed at 70° C. and an absolute pressure of 140 mm. of mercury to give a first condensate fraction equivalent to between about 90% and about 95% of the acid decomposed and consisting of about 90% to about 95% maleic anhydride and about 10% to about 5% maleic acid. A vapor mixture resulting from vaporization of a 75% aqueous solution of maleic acid may be condensed at a temperature of 75° C. and an absolute pressure of 140 mm. of mercury to give a first condensate fraction equivalent to about 65% of the maleic acid treated and consisting of about 92% to about 97% maleic anhydride and about 8% to about 3% maleic acid. A vapor mixture resulting from vaporization of a 40% aqueous solution of maleic acid may be condensed at 65° C. at an absolute pressure of 140 mm. of mercury to give a first condensate fraction of which about 82.5% is maleic anhydride. By increasing the temperature of condensation of the first fraction, the proportion of the condensate recovered in this fraction is reduced but its per cent content of free maleic anhydride is increased for any specific condition of pressure and inert gas content of the vapor mixture; conversely, the lower the condensation temperature, the larger will be the quantity of condensate recovered in this fraction and the lower will be its per cent content of maleic anhydride. To produce a condensate of maximum maleic anhydride content, the condensate should be withdrawn from contact with water vapor as rapidly as possible and a minimum condensate surface should be presented to the uncondensed vapor. It will be apparent, therefore, that the precise conditions of condensation to be employed are dictated to a considerable extent by economic factors. In order to make practical a further purification of the maleic anhydride by distillation, the condensation should be regulated so that the first condensate fraction contains not more than about 20% maleic acid.

Since accurate control of the condensation temperature is desirable to assure maximum purity and yield of maleic anhydride, the condenser is preferably so designed that the temperature of the walls or cooling surfaces is not greatly below the minimum temperature desired, for example about 70° C. Instead of employing a condenser which involves cooling of the maleic anhydride vapors by contact thereof with the cooling surfaces of the said condenser, a direct method of condensation may be employed. Such a direct condensation may employ the cooling effect of contact with a cooler inert liquid or of the latent heat of vaporization of a volatile inert liquid or a combination of both for reducing the sensible heat of the vapor mixture and effecting the condensation of the maleic anhydride. For normal operation at low absolute pressure it will be appreciated that the introduction of substantial additional quantities of vapor to the system may be undesirable as it makes maintenance of vacuum more difficult. The use of a direct contact cooling liquid should be employed only where contact of the maleic anhydride vapors with such liquid is not objectionable.

After the controlled cooling of the vapor mixture to remove maleic anhydride therefrom while retaining water in vapor form, the residual vapor mixture may be further cooled in any suitable manner to condense it to an aqueous mixture which comprises maleic acid, and from which the remainder of the maleic acid may be recovered. Under the preferred conditions of operation described above, the amount of maleic acid which is present in the aqueous maleic acid recovered in this manner is relatively small compared with the amount of maleic anhydride recovered in the first condensation step. This aqueous maleic acid solution may be returned to the process for recovery of its maleic acid content in the form of anhydride, and if desired, it may be concentrated prior to its return, in order to obtain crystals, or a solution of the concentration preferred for the vaporization step.

It is desirable prior to the first condensation to eliminate from the vapor mixture such small quantities of fumaric acid as may be present. At the preferred temperatures, the small quantities of fumaric acid vapors present are at a temperature above the "dew" point of maleic anhydride; the fumaric acid may be removed from the vapor mixture by one or more suitable cooling separators which follow the vaporization apparatus and in which the vapors are cooled to a temperature sufficiently low to effect condensation or sublimation of fumaric acid, but still well above the "dew" point of the maleic anhydride, thus effecting the removal of fumaric acid. The separators also serve to remove entrained solid particles of other impurities. Since the proportions of fumaric acid formed by the vaporization process of the present invention are smaller than produced by the customary methods of maleic anhydride formation, the quantities thereof recovered will be relatively small as compared with the quantities which normally must be separated from maleic anhydride produced by such methods.

The accompanying drawing illustrates diagrammatically a combination of apparatus elements adapted for carrying out the process of one embodiment of the present invention. Since the drawing is entirely diagrammatic, no attempt has been made to picture the various units of apparatus according to scale, but rather the proportions have been selected for clarity of display.

In the drawing the numeral 1 designates a vaporizing apparatus having a metal surface 2 heated by the vapor of a boiling liquid maintained in a boiler 3. A scraper 4 is provided for scraping solids from surface 2 into a collector 5. The scraper is shown in its formal position with its extended position shown in broken lines. A screw conveyor feeding device 6 is provided for introducing maleic acid onto the hot surface. The vapor outlet 7 from the vaporizing apparatus leads to a conventional cooler 8 connected by vapor conduit 9 with a conventional dust separator 10. From the dust separator a conduit 11 leads to a tubular condenser 12. The condenser has any suitable means for separating condensed liquid from uncondensed vapors, as shown at 13. Liquid is withdrawn through outlet 14 which may be a barometric leg. Vapor conduit 15 leads from the tubular condenser to a scrubber 16 wherein the vapors are cooled and washed with cold water introduced at 17. The resulting liquid product is withdrawn at outlet 18 which may be similar to outlet 14. Gases and uncondensed vapors pass to the suction pump (not shown) via conduit 19.

The operation of the above apparatus is as follows: Vacuum is applied until the pressure on the system falls to about 140 mm. of mercury absolute pressure. By means of a liquid maintained in boiler 3 under sufficient pressure to provide a temperature between 215° and 220° C. at the boiling point, surface 2 is heated to a temperature above 200° C. Condensers 8 and 12 are provided with cooling fluids at temperatures of about 135° and 70° C., respectively. Flow of water in scrubber 16 is started and screw conveyor 6 is then rotated to introduce maleic acid gradually onto the hot surface 2. The rate of flow of maleic acid is regulated in accordance with the temperature of the vapors passing off through outlet 7. This rate is controlled so as to provide a vapor mixture at a temperature above 200° C. If the vapor temperature falls below 200° C., the rate of introduction of maleic acid is decreased gradually until the desired temperature is regained. The vapors pass through condenser 8 where they are cooled to about 135° C. to condense fumaric acid, which is separated from the vapor stream in separator 10 and withdrawn as desired through a suitable outlet. Since the fumaric acid is obtained as a solid, the outlet should of course be designed for handling a solid material. The vapors substantially free of fumaric acid then pass into tubular condenser 12 where they are cooled to about 70° C. and maleic anhydride condenses out in liquid phase. The liquid maleic anhydride is withdrawn at 14 and the cooled vapors are passed into scrubber 16 where, by contact with cold water, they are cooled to between 20° and 40° C. In this way remaining maleic anhydride is removed from the gases as a maleic acid solution or slurry and is withdrawn at 18. The cooled gases, free from condensible constituents, are then exhausted through conduit 19 to the vacuum pump. As often as desirable for the purpose of maintaining the reaction rate and high vapor temperature, the surface 2, by means of scraper 4, is scraped free of solid material, which is collected in a suitable collector 5.

The following examples illustrate the manner in which the present invention may be utilized for the recovery of a high yield of maleic acid anhydride from maleic acid solution.

*Example 1.*—In a vaporizing apparatus in which an absolute pressure of 115 mm. of mercury is maintained, a 60% aqueous solution of pure maleic acid is allowed to flow continuously in a fine stream onto a metal surface heated by saturated steam at 145 to 150 pounds per square inch gauge pressure, corresponding to a temperature of about 184° to 186° C. The solution is completely transformed into vapor within an imperceptibly short period of time after contacting the heated surface, the vapor having a temperature of about 160° C. to about 180° C. The vapor consists substantially of maleic anhydride and water vapor in proportions equivalent to the composition of the original solution. The vapor mixture is conducted through a condenser in which it is cooled to a temperature of 64° C. This effects condensation of about 40 parts of condensate containing about 32 parts maleic acid anhydride and about 8 parts maleic acid for each 100 parts of solution vaporized. As will be appreciated by those skilled in the art, the presence of maleic acid is the result of recombination of a portion of the condensed maleic anhydride with water vapor present. The uncondensed vapors, containing the remaining maleic anhydride and water vapor are condensed and absorbed by passing them through (i. e. scrubbing them in) cold water maintained at a temperature between about 20° C. and about 40° C. A solution of maleic acid is thus recovered.

The condensate recovered in the first condenser may be fractionally distilled, if desired, at a pressure of approximately 240 mm. of mercury. When the temperature of the vapors rises to approximately 155° C., the receiver is changed. The first fraction contains nearly all of the combined water present in the product. The second fraction is a distillate of maleic anhydride substantially free from maleic acid.

*Example 2.*—A crude aqueous solution of maleic acid containing 57.8% of maleic acid by weight, and obtained by scrubbing with water the gases from a catalytic converter in which benzene is being oxidized by means of air, is sprayed continuously onto the heating surface of a vaporizer in which an absolute pressure of 140 mm. of mercury is maintained. The hot surface is heated by the vapor of a boiling liquid at a temperature of 215° to 220° C. Substantially all of the volatile constituents of the solution are flash vaporized, resulting in a gaseous mixture at a temperature above 200° C., and consisting almost entirely of maleic anhydride and water vapor. This gaseous mixture is passed through a condenser, and cooled to 70° C. The major portion of the maleic anhydride, equivalent to about 64% of the maleic acid in the vapors, is condensed and is recovered as a faintly yellow colored liquid composed of about 92% by weight of maleic anhydride and 8% maleic acid. The remaining maleic anhydride and water vapor are recovered as an aqueous solution of maleic acid from a second condenser or scrubber wherein the vapors are cooled to between about 20° and about 40° C. From the maleic anhydride mixture, pure, acid-free maleic anhydride may be obtained by fractional distillation as in the first example, or by any other suitable procedure. In this example the amount of fumaric acid formed is less than 1% by weight of the maleic acid flash vaporized.

*Example 3.*—Dry, highly colored, crude crystals of maleic acid containing 95% to 98% maleic acid may be obtained by evaporating or crystallizing the crude solution mentioned in the preceding example. 1535 parts by weight of such crystals are fed continuously, at a uniform rate, over a period of about ten hours, onto a plate steel surface of a vaporizing vessel heated on its nether side by hot combustion gases. An absolute pressure of 140 mm. of mercury is maintained within the vaporizer. While the maleic acid may be pre-melted on its way to the vaporizing surface, reaching the latter as a liquid, it is preferably fed as a relatively finely divided solid directly to the vaporizing surface. In the latter case some fusion of the crystals occurs before vaporization, under the existing conditions of pressure, temperature and heat exchange, but the interval during which any one portion of the maleic acid is in a molten state is extremely short. Feeding of the maleic acid is controlled so that resulting vapor mixture of maleic anhydride and water vapor acquires a temperature of about 200° C. The hot mixture is cooled to about 135° C. and at this temperature is passed through a dust separator for removal of fumaric acid and dust. The cleaned vapor mixture still at about 125° C. is led into a tubular condenser and cooled to about 70° C. by indirect heat exchange with a body of liquid maintained at 70° C. 1160 parts by weight of a very faintly colored liquid are condensed therein, consisting of about 90% maleic anhydride and 10% maleic acid, equivalent to about 90% of the maleic acid vaporized. About 9 parts by weight of fumaric acid, equivalent to about 0.6% of the maleic acid vaporized, is formed according to this method.

We claim:

1. The method of thermally decomposing maleic acid to produce the anhydride thereof without formation of a substantial proportion of fumaric acid, which comprises feeding the maleic acid to a hot vaporizing medium maintained substantially above the temperature of decomposition of maleic acid to maleic anhydride and regulating the rate of feed so that no substantial accumulation of liquid phase maleic acid occurs in the vaporizing zone.

2. The method of thermally decomposing maleic acid to produce maleic anhydride without substantial formation of fumaric acid, which comprises feeding the maleic acid into contact with a hot vaporizing medium maintained at a temperature between 160° C. and 400° C. to decompose the maleic acid and form a maleic-anhydride-containing vapor mixture having a temperature above 150° C. and regulating the rate of feeding said maleic acid to the vaporizing medium so that no substantial accumulation of liquid phase maleic acid occurs in the vaporizing zone.

3. The method of thermally decomposing maleic acid to produce the anhydride thereof, which comprises bringing the maleic acid into contact with a heated surface maintained at a temperature between about 160° and about 400° C. and feeding the maleic acid to the hot surface at such a rate that no substantial accumulation of liquid phase maleic acid occurs thereon.

4. The method of thermally decomposing maleic acid to produce the anhydride thereof, which comprises applying the maleic acid to a surface maintained at a temperature between about 160° C. and about 400° C. and maintaining the surface under a vapor pressure between about 100 and about 250 mm. of mercury absolute and feeding the maleic acid to the hot surface at such a rate that no substantial accumulation of liquid phase maleic acid occurs thereon.

5. The method of thermally decomposing maleic acid to produce the anhydride thereof, which comprises bringing the maleic acid into contact with a heated surface maintained at a temperature between about 180° C. and about 350° C. and feeding the maleic acid to the heated surface at a rate such that the temperature of the vapors so formed is maintained between about 160° C. and about 250° C. and such that no substantial accumulation of liquid phase maleic acid occurs on said surface.

6. The method of thermally decomposing maleic acid to produce the anhydride thereof, which comprises applying crystalline maleic acid to a heated surface maintained at a temperature between about 180° C. and about 350° C and an absolute pressure between about 100 mm. and 250 mm. of mercury, and feeding the maleic acid to the heated surface at a rate such that the temperature of the vapors so formed is maintained between 160° C. and 250° C. and such that no substantial accumulation of liquid phase maleic acid occurs on said surface.

7. The method of thermally decomposing maleic acid to produce the anhydride thereof, which comprises feeding maleic acid, containing not more than three times its weight of water excluding its water of composition, into contact with an evaporating medium maintained at a temperature between about 180° C. and about 350° C. and maintaining the feed rate such that substantially instantaneous total vaporization of the maleic acid is effected and the evaporated zone is maintained substantially free of liquid phase maleic acid.

8. The method of thermally decomposing maleic acid to produce the anhydride thereof, which comprises applying crystalline maleic acid to a heated surface maintained at a pressure between 100 mm. and 250 mm. of mercury and at a temperature between about 180° C. and about 350° C. and regulating the application of maleic acid to the heated surface so that no substantial accumulation of maleic acid occurs thereon.

9. The method of thermally decomposing maleic acid to produce the anhydride thereof, which comprises applying an aqueous solution containing between 25% and 75% of maleic acid to a surface maintained at a pressure between 100 mm. and 250 mm. of mercury and at a temperature between about 180° C. and 350° C. and regulating the application of solution to the heated surface so that no substantial accumulation of solution occurs thereon.

10. The method of preparing maleic anhydride from maleic acid, which comprises bringing the maleic acid into contact with a heated surface maintained at a temperature between about 180° C. and about 350° C. and feeding the maleic acid to the heated surface at a rate such that the temperature of the vapors so formed is maintained between 160° C. and 250° C. and such that no substantial accumulation of liquid phase maleic acid occurs on said surface, and fractionally cooling the resultant mixture to condense maleic anhydride therefrom while retaining water in vapor phase and separately recovering said maleic anhydride.

11. The method of preparing maleic anhydride from maleic acid, which comprises applying the maleic acid to a surface maintained at a temperature between 180° C. and 350° C. and feeding the maleic acid to the heated surface at a rate such that the temperature of the vapors so formed is maintained between about 160° C. and about 250° C. and such that no substantial accumulation of liquid phase maleic acid occurs on said surface, and maintaining the surface under a vapor pressure between about 100 and about 250 mm. of mercury absolute, subjecting the resultant mixture without substantial pressure rise to rapid fractional cooling to a temperature between 60° C. and 140° C. to condense maleic anhydride in liquid phase, promptly separating the liquid maleic anhydride from contact with the cooled uncondensed vapors, and separately recovering said maleic anhydride.

HAROLD B. FOSTER.
JOYCE H. CROWELL.